(12) United States Patent
Buey et al.

(10) Patent No.: US 10,975,804 B2
(45) Date of Patent: Apr. 13, 2021

(54) TRANSLATING OUTER COWL FLOW MODULATION DEVICE AND METHOD

(71) Applicant: United Technologies Corporation, Farmington, CT (US)

(72) Inventors: John R. Buey, Tolland, CT (US); Robert H. Bush, Glastonbury, CT (US); Felix Izquierdo, Jupiter, FL (US)

(73) Assignee: Raytheon Technologies Corporation, Farmington, CT (US)

( * ) Notice: Subject to any disclaimer, the term of this patent is extended or adjusted under 35 U.S.C. 154(b) by 203 days.

(21) Appl. No.: 16/176,692

(22) Filed: Oct. 31, 2018

(65) Prior Publication Data

US 2020/0025148 A1 Jan. 23, 2020

Related U.S. Application Data

(62) Division of application No. 14/522,819, filed on Oct. 24, 2014, now Pat. No. 10,145,336.

(Continued)

(51) Int. Cl.

| F02K 3/00 | (2006.01) |
|---|---|
| F02K 3/077 | (2006.01) |
| F02K 3/02 | (2006.01) |
| F02K 3/075 | (2006.01) |
| F02K 1/09 | (2006.01) |
| F02K 1/15 | (2006.01) |

(52) U.S. Cl.
CPC ............... *F02K 3/077* (2013.01); *F02K 1/09* (2013.01); *F02K 1/15* (2013.01); *F02K 3/02* (2013.01);

(Continued)

(58) Field of Classification Search
CPC . F02K 3/077; F02K 3/075; F02K 1/09; F02K 1/15; F02K 1/383; F02K 1/42
See application file for complete search history.

(56) References Cited

U.S. PATENT DOCUMENTS

| 4,043,508 A * | 8/1977 | Speir ...................... F02K 1/08 239/265.19 |
|---|---|---|
| 4,072,008 A | 2/1978 | Kenworth et al. |

(Continued)

OTHER PUBLICATIONS

Norris, Guy, "New Civil Engine Tempo outstrips Military Developments," Aviation Week & Space Technology, Jan. 19, 2015. http://aviationweek.com/commercial-aviation/new-civil-engine-tempo-outstrips-military-developments.

(Continued)

*Primary Examiner* — Todd E Manahan
*Assistant Examiner* — Edwin Kang
(74) *Attorney, Agent, or Firm* — Kinney & Lange, P. A.

(57) ABSTRACT

A flow control device includes a first axially extending flow control surface, a second axially extending flow control surface radially offset from the first surface to define a gas flow path therebetween, the gas flow path having a downstream flow path exit, and a third axially extending flow control surface radially offset from the first surface and capable of axially translating with respect to the first and second surfaces for modifying the gas flow path and selectively closing the flow path exit. A turbofan engine includes a core flow passage, a fan bypass passage located radially outward from the core flow passage, a third stream bypass passage located radially outward from the fan bypass passage, and a flow control device that dynamically regulates the third stream bypass passage, allowing fluid flowing through the third stream bypass passage to provide thrust to the turbofan engine and reduce afterbody drag.

13 Claims, 3 Drawing Sheets

Related U.S. Application Data

(60) Provisional application No. 61/895,278, filed on Oct. 24, 2013.

(52) U.S. Cl.
CPC .......... *F02K 3/075* (2013.01); *F05D 2240/12* (2013.01); *F05D 2270/051* (2013.01); *F05D 2270/44* (2013.01)

(56) References Cited

U.S. PATENT DOCUMENTS

| | | | |
|---|---|---|---|
| 4,285,194 A * | 8/1981 | Nash | F02K 1/822 60/262 |
| 4,420,932 A | 12/1983 | Mendez et al. | |
| 5,016,818 A | 5/1991 | Nash et al. | |
| 5,136,840 A * | 8/1992 | Nash | F02C 9/18 60/226.3 |
| 5,201,887 A | 4/1993 | Bruchez, Jr. et al. | |
| 5,694,767 A | 12/1997 | Vdoviak et al. | |
| 6,901,739 B2 | 6/2005 | Christopherson | |
| 2009/0016874 A1* | 1/2009 | Corsmeier | F02K 3/075 415/145 |
| 2012/0167549 A1 | 7/2012 | Lariviere et al. | |

OTHER PUBLICATIONS

GE Aviation, "GE Aviation and the Ceramic Matrix Composite Revolution," YouTube, Oct. 29, 2015. https://www.youtube.com/watch?v=is1BBilkyUM&feature=youtu.be.

* cited by examiner

TRANSLATING OUTER COWL FLOW MODULATION DEVICE AND METHOD

CROSS-REFERENCE TO RELATED APPLICATION(S)

This application is a divisional of U.S. application Ser. No. 14/522,819 filed Oct. 24, 2014 for "TRANSLATING OUTER COWL FLOW MODULATION DEVICE AND METHOD" by J. Buey, R. Bush and F. Izquierdo, which in turn claims the benefit of U.S. Provisional Application No. 61/895,278 filed Oct. 24, 2013 for "TRANSLATING OUTER COWL FLOW MODULATION DEVICE AND METHOD" by J. Buey, R. Bush and F. Izquierdo.

STATEMENT OF GOVERNMENT INTEREST

This invention was made with government support under FA8650-09-D-2923-0021 awarded by the United States Air Force. The government has certain rights in this invention.

BACKGROUND

Modern aircraft engines desire both the fuel efficiency of high-bypass turbofans and the high specific thrust of a low-bypass turbofan. Engine performance and engine efficiency are generally in conflict according to traditional engine architectures. High-performing engines tend to be less efficient, and highly efficient engines tend to lack the thrust capabilities of high performance engines. As a result of this conflict, an engine is usually designed to best meet requirements for its primary objective. Thus, military aircraft generally utilize high-performing engines while commercial aircraft use high-efficiency engines.

Advances in engine architecture suggest that adding a second bypass stream to a traditional turbofan can provide significant benefits. The core engine flow is considered the primary or first stream, an inner bypass stream is the second stream, and an additional second bypass stream is the third stream. An engine having three airflow streams can be independently modulated to provide additional core flow (higher-performance) or additional bypass flow (higher-efficiency). In order to achieve these cycle benefits, each of the flows must exit via one or more nozzles that provide efficient thrust generation and reduces any drag penalty.

SUMMARY

A flow control device for a gas turbine engine includes a first axially extending flow control surface, a second axially extending flow control surface that is radially offset from the first flow control surface to define a gas flow path therebetween, the gas flow path having a downstream flow path exit, and a third axially extending flow control surface that is radially offset from the first flow control surface and capable of axially translating with respect to the first and second flow control surfaces for modifying the gas flow path and selectively closing the flow path exit.

A turbofan engine includes a core flow passage, a fan bypass passage located radially outward from the core flow passage, a third stream bypass passage located radially outward from the fan bypass passage, and a flow control device that dynamically regulates the third stream bypass passage, allowing fluid flowing through the third stream bypass passage to provide thrust to the turbofan engine and reduce afterbody drag.

A method for modifying exhaust flow of a gas turbine engine includes delivering air to a core flow path, a bypass flow path and a third stream flow path using a fan, and adjusting an annular movable cowl within the third stream flow path between an upstream closed position and a downstream fully open position for dynamically regulating flow within the third stream flow path. The position of the movable cowl determines an amount of flow through the third stream flow path and along an outer portion of an exhaust nozzle and an amount of flow through the core flow path.

DETAILED DESCRIPTION

A flow control device is described herein. The flow control device controls the flow of gas through a third stream bypass passage. By controlling the third stream gas flow, a turbofan engine can operate in a high-performance mode (high thrust) or a high-efficiency mode (reduced specific fuel consumption). Engines utilizing the described flow control device can take advantage of additional thrust when needed (e.g., takeoff) or reduce fuel usage during cruising.

Figure 1:
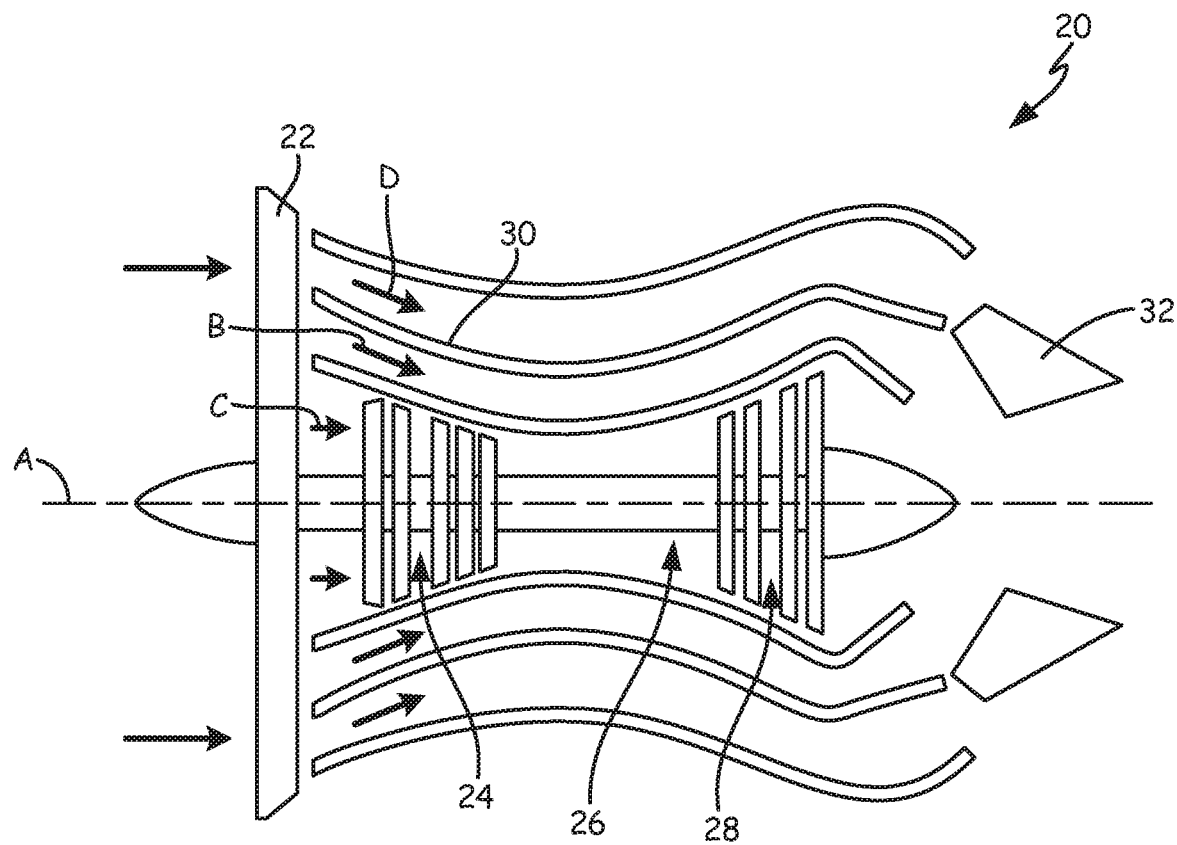
FIG. 1 is a cross section view of a turbofan engine.

FIG. 1 is a cross section view that schematically illustrates an example gas turbine engine 20 that includes fan section 22, compressor section 24, combustor section 26 and turbine section 28. Fan section 22 drives air along bypass flow path B and third stream flow path D while compressor section 24 draws air in along core flow path C where air is compressed and communicated to combustor section 26. In combustor section 26, air is mixed with fuel and ignited to generate a high pressure exhaust gas stream that expands through turbine section 28 where energy is extracted and utilized to drive fan section 22 and compressor section 24.

As shown in FIG. 1, third stream flow path D is located radially outward from (with respect to engine centerline axis A) and is a separate and distinct passage from bypass flow path B. Third stream flow path D is separated from bypass flow path B within fan section 22 by one or more liner segments 30. In some embodiments, third stream flow path D is an annular passage extending downstream of fan 22 that wraps around engine 20. Third stream flow path D extends downstream to a region near exhaust nozzle 32 located downstream of turbine section 28. In some embodiments, exhaust nozzle 32 is annular. Providing third stream flow path D and exhaust nozzle 32 in annular arrangement reduces afterbody drag.

Depending on the operating mode of engine 20, third stream flow path D is open and acts as a second bypass flow path or third stream flow path D is closed and additional flow is directed to core flow path C. When third stream flow path D is open, additional air bypasses core flow path C and bypass flow path B and the amount of fuel burned in combustor section 26 is reduced. In this operating mode, the additional bypass air provides additional fan thrust and less jet thrust. When third stream flow path D is closed, air is unable to flow through third stream flow path D and the air that would normally flow through an open third stream flow path D is diverted to core flow path C and bypass flow path B, increasing the core flow. In this operating mode, the increased core flow provides additional jet thrust and reduced fan thrust.

Figure 2:
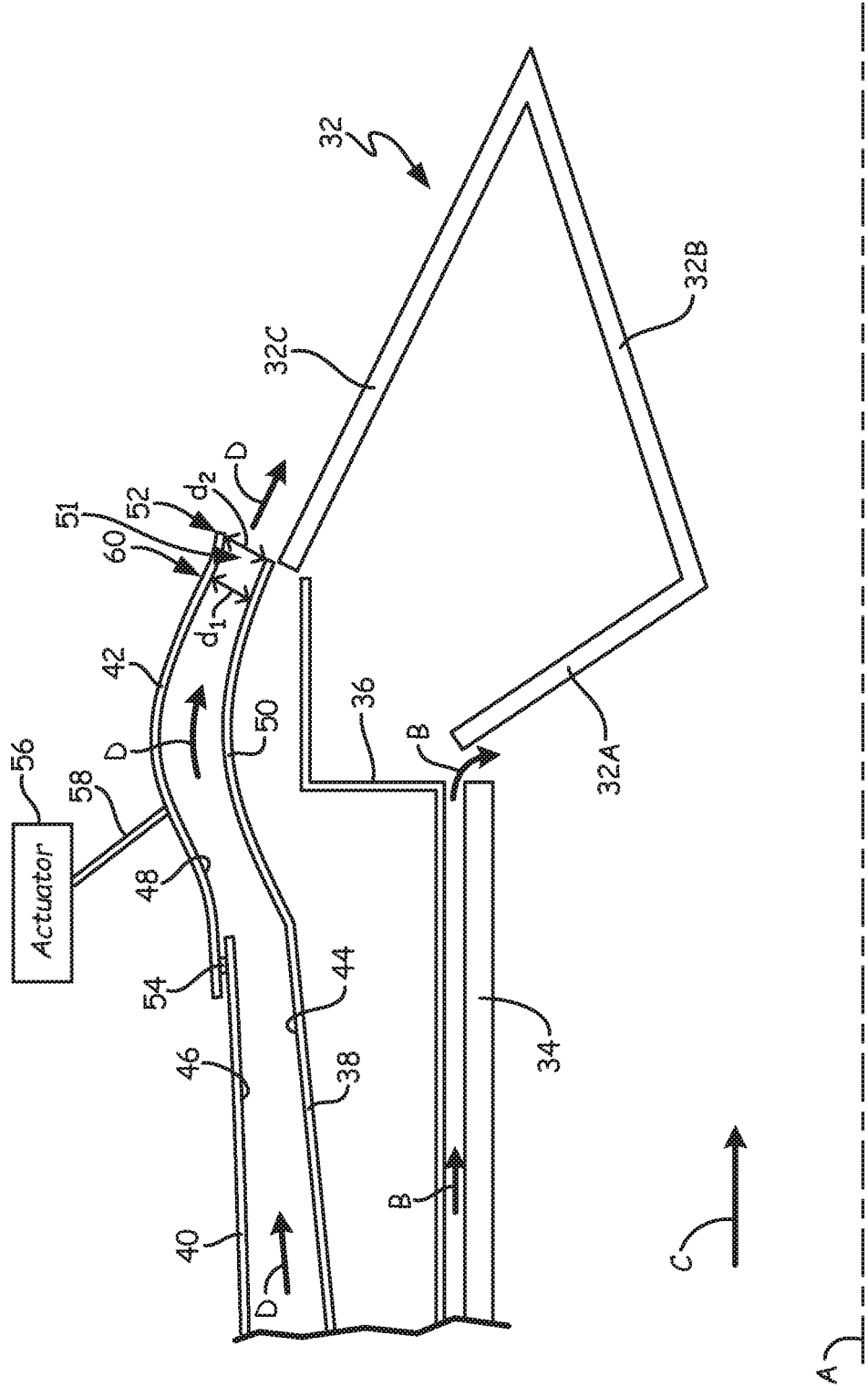
FIG. 2 is a cross section view illustrating one embodiment of a translating outer cowl in an open position.
Figure 3:
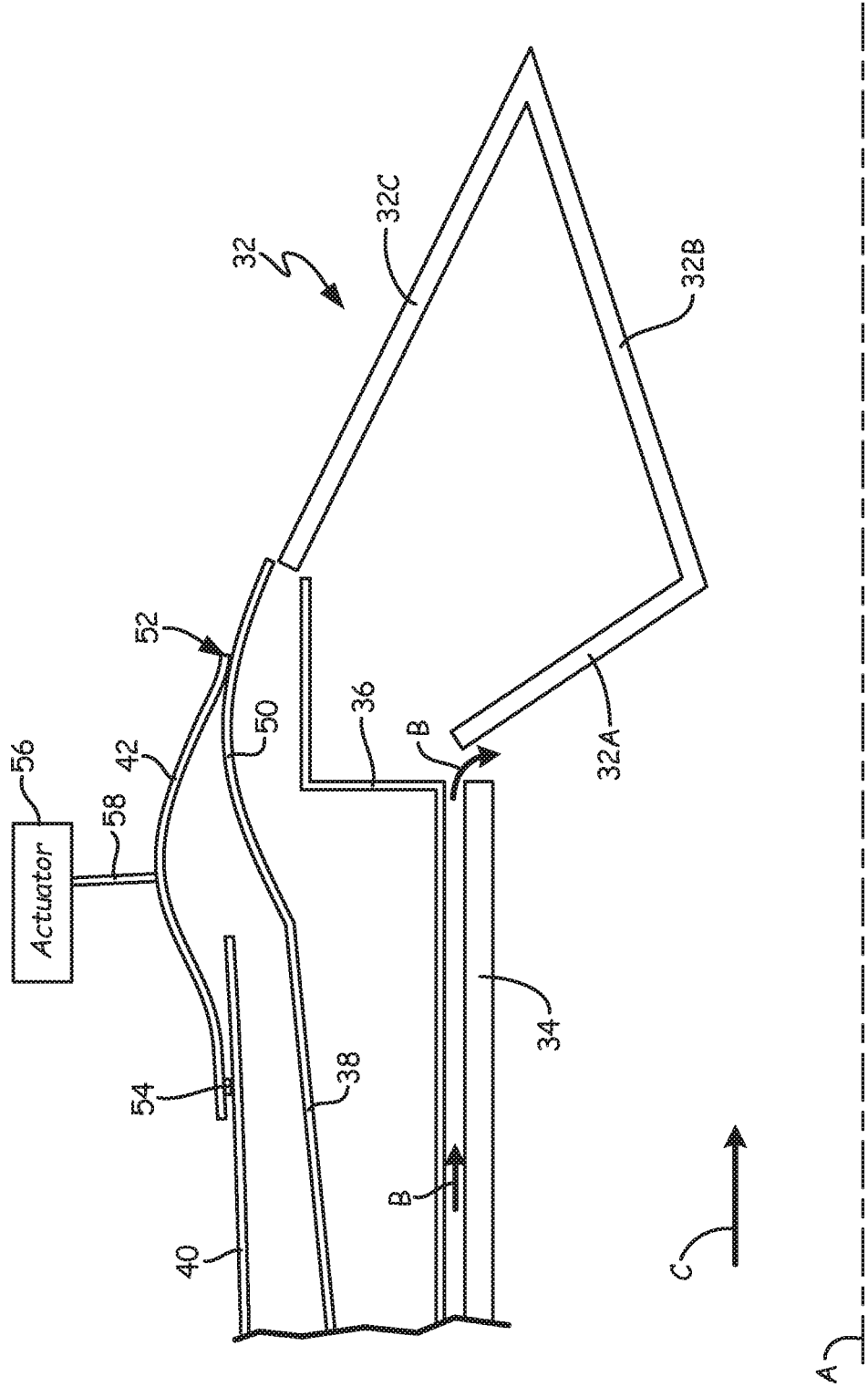
FIG. 3 is a cross section view illustrating the translating outer cowl in a closed position.

FIGS. 2 and 3 schematically illustrate cross section views of one embodiment of a translating outer cowl used to control the flow of air through third stream flow path D. As shown in FIGS. 2 and 3, engine 20 includes exhaust nozzle 32, core flow path liner 34, bypass outer liner 36, third stream inner liner 38, third stream outer liner 40 and cowl 42. Exhaust nozzle 32 is a convergent/divergent nozzle at the downstream end of engine 20 and includes convergent section 32A, divergent section 32B and external flap 32C. Convergent section 32A, divergent section 32B and external flap 32C are connected to one another with hinges allowing exhaust nozzle 32 to take differing configurations. Core flow path liner 34 and exhaust nozzle 32 direct the flow of gases through core flow path C. Gas flow through core flow path C converges at the convergent section 32A and diverges at divergent section 32B. Air in bypass flow path B flows between core flow path liner 34 and bypass outer liner 36 as shown by arrows B. Air flowing through bypass flow path B is directed along the convergent section 32A where it joins the gases flowing through core flow path C.

The flow of air through third stream flow path D is controlled by inner liner 38, outer liner 40 and cowl 42. Inner liner 38 is an axially extending flow control surface and separates third stream flow path D from other flow paths within engine 20 and includes surface 44 that defines the radially inner extent of third stream flow path D. Outer liner 40 and cowl 42 are additional axially extending flow control surfaces. As shown in FIGS. 2 and 3, outer liner 40 and cowl 42 are radially offset from inner liner 38. Together, inner liner 38, outer liner 40 and cowl 42 separate third stream flow path D from the engine core and the engine bay surrounding engine 20. Outer liner 40 includes surface 46 and cowl 42 includes surface 48; surfaces 46 and 48 define the radially outer extent of third stream flow path D. In some embodiments, cowl 42 is an annular metal sheet.

A joint is formed between outer liner 40 and cowl 42, and cowl 42 is movable relative to outer liner 40. In some embodiments, the joint formed between outer liner 40 and cowl 42 is a sliding joint, allowing cowl 42 to translate fore and aft relative to outer liner 40 and substantially parallel to engine central longitudinal axis A. The position of cowl 42 dynamically controls the flow of air through third stream flow path D. As shown in FIG. 2, cowl 42 is joined to outer liner 40 near the downstream end of outer liner 40. In this position, third stream flow path D is in an open position and air is allowed to flow through third stream flow path D between inner liner 38 and outer liner 40 and, later, between cowl 42 and downstream portion 50 of inner liner 38 as shown by arrows D, eventually exiting third stream flow path D at flow path exit 51. Air flowing through third stream flow path D between cowl 42 and inner liner 38 bypasses core flow path C, exits engine 20 at flow path exit 51 along external flap 32C of exhaust nozzle 32 and provides fan thrust. As more air bypasses core flow path C in this operating mode, less fuel is delivered to combustor section 26, reducing specific fuel consumption and improving engine efficiency. Thus, positioning cowl 42 so that third stream flow path D is in an open position is generally performed during flight conditions that do not require a large proportion of jet thrust (e.g., cruising).

As shown in FIG. 3, cowl 42 is joined to outer liner 40 upstream of the location to which it is joined in FIG. 2. By translating cowl 42 forward to the position shown in FIG. 3, downstream end 52 of cowl 42 abuts downstream portion 50 of inner liner 38, closing the downstream outlet of third stream flow path D. In this position, third stream flow path D is in a closed position and air is not allowed to flow through third stream flow path D between inner liner 38 and outer liner 40; flow path exit 51 is closed. In the closed position, air is generally unable to flow through third stream flow path D, and the air directed from fan 22 towards third stream flow path D is instead diverted to core flow path C, where it is compressed and combusted along with the other gases flowing through core flow path C, and bypass flow path B. As additional air is delivered to core flow path C in this operating mode, more fuel is delivered to combustor section 26, increasing the amount of jet thrust produced by engine 20. Thus, positioning cowl 42 so that third stream flow path D is in a closed position is generally performed during flight conditions that require a larger proportion of jet thrust (e.g., takeoff, ascent).

Seal 54 can be positioned between cowl 42 and outer liner 40 to reduce or prevent air leakage from third stream flow path D. In some embodiments, seal 54 is an annular seal fixed to cowl 42 near its upstream end. As cowl 42 translates fore and aft, seal 54 is carried by cowl 42 so that it remains positioned between cowl 42 and outer liner 40. In one particular embodiment, seal 54 is a finger seal.

One or more actuators 56 can be used to control movement of cowl 42. In some embodiments, a number of actuators 56 circumferentially spaced around cowl 42 are used to move cowl 42. In one particular embodiment, six circumferentially-spaced actuators 56 control the movement of cowl 42. Actuators 56 can be operated using electric current, hydraulic fluid pressure, pneumatic pressure or other energy sources. Actuators 56 can be connected to cowl 42 by linkage 58, which pushes or pulls cowl 42 into the desired position relative to outer liner 40. Actuators 56 can be mounted to a static structure on the outside of engine 20. In some embodiments, actuators 56 are controlled by an electronic engine controller (EEC) or full authority digital engine control (FADEC).

In the embodiment illustrated in FIGS. 2 and 3, downstream portion 50 and cowl 42 are curved to allow for dynamic control of the flow of air through third stream flow path D. Downstream portion 50 of inner liner 38 has a convex shape relative to third stream flow path D, and cowl 42 has a concave shape relative to third stream flow path D. In this embodiment, the convex shape of downstream portion 50 and the concave shape of cowl 42 are substantially complementary (i.e. minor differences in the general shapes can exist to create a convergent/divergent nozzle as described below). Air flowing through third stream flow path D follows the path dictated by the curves of downstream portion 50 and cowl 42.

In some embodiments, the curvature of cowl 42, while substantially complementary to the curvature of downstream portion 50, provides a convergent/divergent nozzle between cowl 42 and downstream portion 50. For example, as shown in FIG. 2, throat 60 is formed between cowl 42 and downstream portion 50 where the two structures converge. At throat 60 the distance between cowl 42 and downstream portion 50 is shown as $d_1$. Downstream of throat 60, cowl 42 and downstream portion 50 diverge. At downstream end 52 the distance between cowl 42 and downstream portion 50 is shown as $d_2$. As illustrated in FIG. 2, $d_1$ is smaller than $d_2$. By converging cowl 42 and downstream portion 50 at throat 60 and diverging cowl 42 and downstream portion 50 between throat 60 and downstream end 52, a convergent/divergent nozzle is formed for third stream flow path D between cowl 42 and downstream portion 50.

While annular embodiments of third stream flow path D and exhaust nozzle 32 have been described above, other embodiments of the present invention include arrangements of exhaust nozzle 32 that are not annular or axisymmetric. In this case third stream flow path D diverts the flow to a translating cowl nozzle positioned above, below, beside or around a two dimensional nozzle, uses external flaps 32C to expand the flow within third stream flow path D, and controls third stream flow path D with axial movement of translating cowl 42.

A convergent/divergent nozzle in third stream flow path D allows for dynamic control of the flow of air through third stream flow path D. By adjusting the position of cowl 42 relative to downstream portion 50, the location of throat 60 and the distance between surface 48 of cowl 42 and surface 44 of downstream portion 50 of inner liner 38 can be adjusted to control the amount of air flowing through third stream flow path D. Translating cowl 42 upstream along outer liner 40 generally moves throat 60 farther upstream and restricts the amount of air flowing through third stream flow path D. As noted above, an EEC or FADEC type controller can be used to dynamically position cowl 42 so that the desired amounts of air flow through third stream flow path D and are diverted to core flow path C. Cowl 42 serves as a flow control device that enables additional control over the amount of air that is allowed to bypass core flow path C through third stream flow path D and generate fan thrust. By adjusting the air flow through third stream flow path D, an engine can alternate between high-performance and high-efficiency modes of operation and the amount of air bypassing core flow path C can be dynamically controlled.

Discussion of Possible Embodiments

The following are non-exclusive descriptions of possible embodiments of the present invention.

A flow control device for a gas turbine engine can include a first axially extending flow control surface, a second axially extending flow control surface that is radially offset from the first flow control surface to define a gas flow path therebetween, the gas flow path having a downstream flow path exit, and a third axially extending flow control surface that is radially offset from the first flow control surface and capable of axially translating with respect to the first and second flow control surfaces for modifying the gas flow path and selectively closing the flow path exit.

The flow control device of the preceding paragraph can optionally include, additionally and/or alternatively, any one or more of the following features, configurations and/or additional components:

A further embodiment of the foregoing flow control device can further include that the first, second and third flow control surfaces are annular structures for reducing afterbody drag.

A further embodiment of any of the foregoing flow control devices can further include that the first flow control surface has a portion that is convex relative to the gas flow path and the third flow control surface has a portion that is concave relative to the gas flow path.

A further embodiment of any of the foregoing flow control devices can further include that the convex portion of the first flow control surface and the concave portion of the third flow control surface have substantially complementary shapes.

A further embodiment of any of the foregoing flow control devices can further include that the convex portion of the first flow control surface and the concave portion of the third flow control surface are shaped so that the gas flow path converges at a first location between the first flow control surface and the third flow control surface and diverges at a second location downstream from the first location.

A further embodiment of any of the foregoing flow control devices can further include that the third flow control surface includes a metal sheet.

A further embodiment of any of the foregoing flow control devices can further include that the third flow control surface is translatable between an upstream closed position and a downstream fully open position.

A further embodiment of any of the foregoing flow control devices can further include one or more actuators located circumferentially around the third flow control surface for controlling movement of the third flow control surface.

A further embodiment of any of the foregoing flow control devices can further include a seal located between the second flow control surface and an upstream portion of the third flow control surface.

A further embodiment of any of the foregoing flow control devices can further include that the gas flow path is located circumferentially outward from a first bypass flow path, and wherein the gas flow path provides thrust to a gas turbine engine.

A further embodiment of any of the foregoing flow control devices can further include that the gas flow path is non-axisymmetric.

A turbofan engine can include a core flow passage, a fan bypass passage located radially outward from the core flow passage, a third stream bypass passage located radially outward from the fan bypass passage, and a flow control device that dynamically regulates the third stream bypass passage, allowing fluid flowing through the third stream bypass passage to provide thrust to the turbofan engine and reduce afterbody drag.

The turbofan engine of the preceding paragraph can optionally include, additionally and/or alternatively, any one or more of the following features, configurations and/or additional components:

A further embodiment of the foregoing turbofan engine can further include that the third stream bypass passage is defined by a first axially extending flow control surface, a second axially extending flow control surface that is radially offset from the first flow control surface, and the flow control device, where the flow control device is a third axially extending flow control surface, where the first flow control surface includes a portion that is convex relative to the third stream bypass passage, and where the third flow control surface includes a portion that is concave relative to the third stream bypass passage.

A further embodiment of any of the foregoing turbofan engines can further include that the convex portion of the first flow control surface and the concave portion of the third flow control surface have substantially complementary shapes.

A further embodiment of any of the foregoing turbofan engines can further include that the convex portion of the first flow control surface and the concave portion of the third flow control surface are shaped so that the third stream bypass passage converges at a first location and diverges at a second location downstream from the first location.

A further embodiment of any of the foregoing turbofan engines can further include one or more actuators located circumferentially around the third flow control surface for controlling movement of the third flow control surface.

A further embodiment of any of the foregoing turbofan engines can further include a seal located between the second flow control surface and an upstream portion of the third flow control surface.

A method for modifying exhaust flow of a gas turbine engine can include delivering air to a core flow path, a bypass flow path and a third stream flow path using a fan, and adjusting an annular movable cowl within the third stream flow path between an upstream closed position and a downstream fully open position for dynamically regulating flow within the third stream flow path. The position of the movable cowl can determine an amount of flow through the third stream flow path and along an outer portion of an exhaust nozzle and an amount of flow through the core flow path.

The method of the preceding paragraph can optionally include, additionally and/or alternatively, any one or more of the following features, configurations and/or additional components:

A further embodiment of the foregoing method can further include that moving the movable cowl upstream increases flow through the core flow path, and wherein moving the cowl downstream increases flow through the third stream flow path.

A further embodiment of any of the foregoing methods can further include that flow through the third stream flow path produces thrust.

Although the present invention has been described with reference to preferred embodiments, workers skilled in the art will recognize that changes may be made in form and detail without departing from the spirit and scope of the invention.

The invention claimed is:

1. A method for modifying exhaust flow of a gas turbine engine, the method comprising:
    providing a core flow path, wherein the core flow path is defined by a core flow path liner;
    providing a bypass flow path radially offset from the core flow path, wherein the bypass flow path is defined between the core flow path liner and an inner liner containing a first axially extending flow control surface opposite the bypass flow path;
    providing a third stream flow path radially offset from the core flow path and the bypass flow path wherein the third streamflow path is defined by:
        the first axially extending flow control surface having a first upstream end and a first downstream end;
        a second axially extending flow control surface having a second upstream end and a second downstream end, the second axially extending flow control surface radially offset from the first axially extending flow control surface wherein the second downstream end of the second axially extending flow control surface is upstream of the first downstream end of the first axially extending flow control surface; and
        a third axially extending flow control surface comprising a third upstream end and a third downstream end, wherein the third upstream end is downstream of the first upstream end of the first axially extending flow control surface, the third axially extending surface is sealingly engaged with and extending from the second axially extending flow control surface at the third upstream end of the third axially extending flow control surface and the second downstream end of the second axially extending flow control surface;
    delivering an airflow to an annular movable cowl with a fan; and
    adjusting the annular movable cowl within the third stream flow path between an upstream closed position and a downstream fully open position for dynamically regulating the airflow within the third stream flow path, wherein positioning of the annular movable cowl determines an amount of the airflow through the third stream flow path and along an outer portion of an exhaust nozzle and an amount of flow through the core flow path and wherein the annular moveable cowl dynamically selectively allows closing of the third stream flow path to prevent the airflow by translating the third axially extending flow control surface, the third axially extending flow control surface translatable between the upstream closed position where the downstream end of the third axially extending flow control surface contacts the first axially extending flow control surface, and the downstream fully open position where the downstream end of the third axially extending flow control surface is spaced from the downstream end of the first axially extending flow control surface.

2. The method of claim 1, wherein moving the annular movable cowl upstream increases the amount of the flow through the core flow path.

3. The method of claim 2, wherein moving the annular movable cowl downstream increases the airflow through the third stream flow path.

4. The method of claim 1, wherein the airflow through the third stream flow path produces thrust.

5. The method of claim 1, wherein the airflow through the third stream flow path reduces afterbody drag.

6. The method of claim 1, wherein the core flow path is located centrally in the gas turbine engine.

7. The method of claim 1, wherein the bypass flow path is located circumferentially outward from the core flow path.

8. The method of claim 1, wherein the third stream flow path is located circumferentially outward from the bypass flow path.

9. The method of claim 1, wherein adjusting the annular moveable cowl comprises actuating one or more actuators located circumferentially around the annular moveable cowl for controlling movement of the annular moveable cowl.

10. The method of claim 1, wherein the third stream flow path is axisymmetric.

11. The method of claim 1, wherein the first axially extending flow control surface comprises a convex portion that is convex relative to the third stream flow path, and the third axially extending flow control surface comprises a concave portion that is concave relative to the third stream flow path.

12. The method of claim 11, wherein the convex portion of the first axially extending flow control surface and the concave portion of the third axially extending flow control surface have substantially complementary shapes.

13. The method of claim 12, wherein the convex portion of the first axially extending flow control surface and the concave portion of the third axially extending flow control surface are shaped so that the third stream flow path converges at a first location and diverges at a second location downstream from the first location.

* * * * *